FIG. 1

INVENTOR.
LEROY F. GRANTHAM

FIG.2

United States Patent Office 3,754,074
Patented Aug. 21, 1973

3,754,074
REMOVAL OF NITROGEN OXIDES AND OTHER IMPURITIES FROM GASEOUS MIXTURES
Le Roy F. Grantham, Calabasas, Calif., assignor to North American Rockwell Corporation
Continuation-in-part of application Ser. No. 684,239, Nov. 20, 1967. This application Feb. 20, 1970, Ser. No. 13,248
Int. Cl. B01d 53/34
U.S. Cl. 423—210.5
19 Claims

ABSTRACT OF THE DISCLOSURE

A method for removing nitrogen oxides, lead compounds, and other gaseous and particulate impurities from waste gases by contacting the waste gases with a molten alkali metal carbonate mixture. Dependent upon the particular impurity removed, such as nitrogen oxides, the absorbent carbonate mixture is regenerated by treatment with a reducing agent.

CROSS-REFERENCES TO RELATED INVENTIONS

This application is a continuation-in-part of application Ser. No. 684,239, filed Nov. 20, 1967, and since abandoned.

BACKGROUND OF THE INVENTION

This invention relates to a process for the removal of nitrogen oxides from gaseous mixtures. It further relates to the removal of various gaseous, liquid and solid impurities from waste gases, such as flue gas and exhaust gas. Additionally, the invention also relates to the removal of solid particulate matter from such hot combustion gases.

Of the various gaseous impurities removed by the present process, nitrogen oxides are perhaps one of the most important. Nitrogen oxides. $NO_x$, principally as NO and $NO_2$, are present in the waste gases discharged from many metal refining and chemical plants such as in nitric acid producing plants, in the flue gases from power plants generating electricity by the combustion of fossil fuels, and in the exhaust gas from internal combustion engines. The control of air pollution resulting from the discharge into the atmosphere of waste gases containing these nitrogen oxides has become increasingly urgent. An additional incentive for the removal of nitrogen oxides from waste gases is the recovery of nitrogen values otherwise lost by discharge of the gases to the atmosphere.

Typical concentrations of nitrogen oxides in waste gases are 200–1500 p.p.m. from electric generating plants, 100–5000 p.p.m. from automobiles and 1000–4000 p.p.m. from fertilizer plants. Removal of these nitrogen compounds from the waste gases is difficult and expensive because of the large volumes of the waste gases relative to the quantity of nitrogen oxides which they contain. Also, the possible by-products that could be produced from the recoverable nitrogen values, while having extensive markets as basic raw materials, sell for relatively low prices. Consequently, low cost recovery processes are required.

Several processes have been proposed and investigated for the removal of nitrogen oxides from waste gases, particularly from industrial stack gases. In typical wet absorption processes, aqueous solutions or organic fluids are used to wash the waste gases and thereby remove the nitrogen oxides present. While the various wet processes have some advantageous features, they all suffer from the common drawback that the waste gas is cooled substantially and becomes saturated with water vapor from the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment create substantial problems. Also, operational difficulties occur because of corrosion of equipment utilized.

In various dry processes, the impure waste gas is led over or through a solid or powdered absorption medium. In general, reaction between a solid and gas is relatively slow and inefficient, being limited to the available surface area of the solid. Also, the resultant products generally do not readily lend themselves to regeneration of the starting material or recovery of the removed nitrogen values.

Additionally, in automobile exhaust gas, catalytic decomposition or catalytic reduction has been attempted to convert the nitrogen oxide present to nitrogen and oxygen, or to nitrogen and $CO_2$. These methods, however, are slow or generally not practical, because it has been found that the catalyst deteriorates in effectiveness. It is believed this deterioration is due to the poisoning of the catalyst by lead and carbonaceous material present. Further, the catalysts used have been expensive, and their attrition rate is high. Recycle of the automotive exhaust gas has been successful in reducing the $NO_x$ content of the emitted exhaust gas, but usally at the penalty of a substantial deterioration in engine performance. Thus to date there has not been a suitable economical means available for removal of the nitrogen oxides from automotive exhaust gas as well as from power plant flue gas.

While the removal of nitrogen oxides from waste gases is a principal object of the present invention, it is also directed to the removal of many other impurities found in the combustion gases emitted by power plants and internal combustion engines. For example, various lead species, particularly lead halides, which may be present in gaseous, liquid or solid form, are found in automotive exhaust gas. By utilization of the herein process, these lead halides will be effectively removed from the automotive exhaust gas.

In addition to the removal of gaseous impurities, the herein process can serve to remove solid particulate matter, including fly ash, from combustion flue gases. Both electrostatic precipitators and cyclone separators are conventionally utilized in attempting to remove solid particulate matter from combustion exhaust. However, fly ash, which is a solid particulate matter present in the combustion gas from power plants and is normally comprised of various metal oxides, depending upon the fuel source, is not completely removed by precipitators or separators. Generally, most of the fly ash particles are less than 50 microns in size, in some instances being under 10 microns. Also, the present process may be utilized to remove solid particulate matter from automotive exhaust gas, particularly present in the form of lead halides or other lead species, corrosion particles, and various carbonaceous substances.

SUMMARY OF THE INVENTION

It is an object of the present invention to provide a method for the removal of nitrogen oxides, lead species, particularly lead haildes, and various other gaseous impurities and solid particulate matter from waste gases utilizing inexpensive, readily available materials, without necessitating the utilization of expensive equipment. In accordance with the broad aspects of this invention, these impurities are removed from the waste gas by contacting it with a molten salt mixture containing alkali metal carbonates as active absorbent for these impurities.

In one embodiment of the invention, the gas contacts the molten salt on a surface wetted by the molten salt, preferably in the form of a packing or mesh.

As described in copending application Ser. No. 13,246, filed Feb. 20, 1970, now U.S. Patent 3,718,733, a selected mesh wetted with the molten salt mixture containing carbon dispersed therein may be used for nitric oxide removal from a $CO_2$-containing gaseous mixture relatively free of oxygen. For an $NO+CO$ reaction, NO removal appears to occur more effectively on a selected mesh when it is in a relatively unwetted condition even where there are varying amounts of oxygen present in the CO-containing gas.

The most important of the impurities removed are the nitrogen oxides. However, in addition to the absorption of nitrogen oxides, other impurities absorbed include halogens, halides, metal oxides, oxides and organic compounds of elements from Group V-A of the Periodic Table (N, P, As, Sb, Bi), hydrogen containing acids, and organic sulfur-containing compounds. These impurities are removed from the gas by contacting it with a molten salt mixture containing alkali metal carbonates as the active absorbent. A chemical reaction occurs between the impurities and the molten salt to produce the alkali metal salt of the gaseous impurity and release $CO_2$. In addition, in some cases the reaction also produces the oxide of the metal or water when the impurity is a hydrogen-containing acid.

For certain applications, depending upon the material removed, the molten salt is regenerated. This is particularly desirable in the removal of nitrogen oxides where the carbonate is regenerated and nitrogen values are recoverable as a feedstock for a nitric acid plant. In other applications, as in the removal of lead species, e.g., lead halides, from an internal combustion engine exhaust gas, lead oxide is formed, which in turn initially tends to react with the metal of the container, forming metal oxide and lead. The lead forms as a protective layer on the surface of the container, in addition to a sludge on the bottom, not interfering with the molten salt. In such an instance, the molten salt is preferably not regenerated.

In the removal of most solid particulate matter, a chemical reaction with the molten salt is apparently not involved, in contrast to the removal of most of the gaseous materials mentioned above. As a result, the molten salt is effective in removing virtually any particulate matter, and effective removal is not dependent upon the chemical composition of the particulate matter. The mechanism for removal of the particulate matter by the molten salt is believed to involve a wetting of the particles with the salt. Thus by assuring contact between the combustion gas and the molten salt, removal can be achieved. Thus the molten salt is useful for the removal of fly ash, which is generally comprised of various metal oxides, including the oxides of silicon, aluminum, iron, titanium, magnesium, and calcium. The molten salt effectively removes the solid particulate lead halides, corrosion particulates and various carbonaceous particles present in automotive exhaust. It is noted, however, that in the removal of lead halides from automotive exhaust, whether in solid, liquid, or gaseous form, a chemical reaction with the molten salt is believed to occur.

A particularly preferred absorbent in the practice of this invention is the ternary eutectic of the carbonates of lithium, sodium and potassium, having a melting point of about 395° C. In practicing the invention, the portion of the salt contacting the gases to effect removal of the impurities must be molten and thus is heated to at least the melting temperature of the salt. In the removal of flue gases, the entire body of molten salt will ordinarily be so heated. However, in a simple muffler device, containing the alkali-metal carbonates, only a surface layer of the carbonate might be heated to the melting temperature by passage of the hot exhaust gases over the carbonate surface.

This invention principally relates to a process for the removal of nitrogen oxides from waste gases, particularly flue gases and automotive exhaust gases, since this impurity is often present in a significant detrimental amount and considerable effort is being directed to its effective removal. A further feature and embodiment involves various means for regenerating the molten carbonate after removal of the nitrogen oxides. A still further feature pertains to the removal of various other gaseous impurities as well as methods of regeneration of the carbonate where applicable. Still another feature relates to the removal of the solid particulate matter. These several embodiments and features are hereinafter described.

DESCRIPTION OF PREFERRED EMBODIMENTS

Removal of nitrogen oxides

Any gas having a nitrogen oxide content may be effectively contacted with a molten salt mixture containing alkali metal carbonates as reactive absorbent. Nitric oxide present in the gas will be converted to alkali metal nitrite and nitrate; nitrogen dioxide present will similarly be converted to alkali metal nitrite and nitrate. While these nitrogen oxide compounds, particularly NO, are those principally present in waste gases, other nitrogen oxides, e.g., $N_2O_3$, $N_2O_4$, or $N_2O_5$, that may be present in the waste gas will be similarly absorbed and converted. Where purification of the waste gas by elimination of its nitrogen oxide content is the essential consideration, the present process is of utility in this regard whether or not the absorption step is followed by a regeneration step wherein the alkali metal carbonate is regenerated, and is independent of whether the nitrogen values are recovered.

Figure 1:
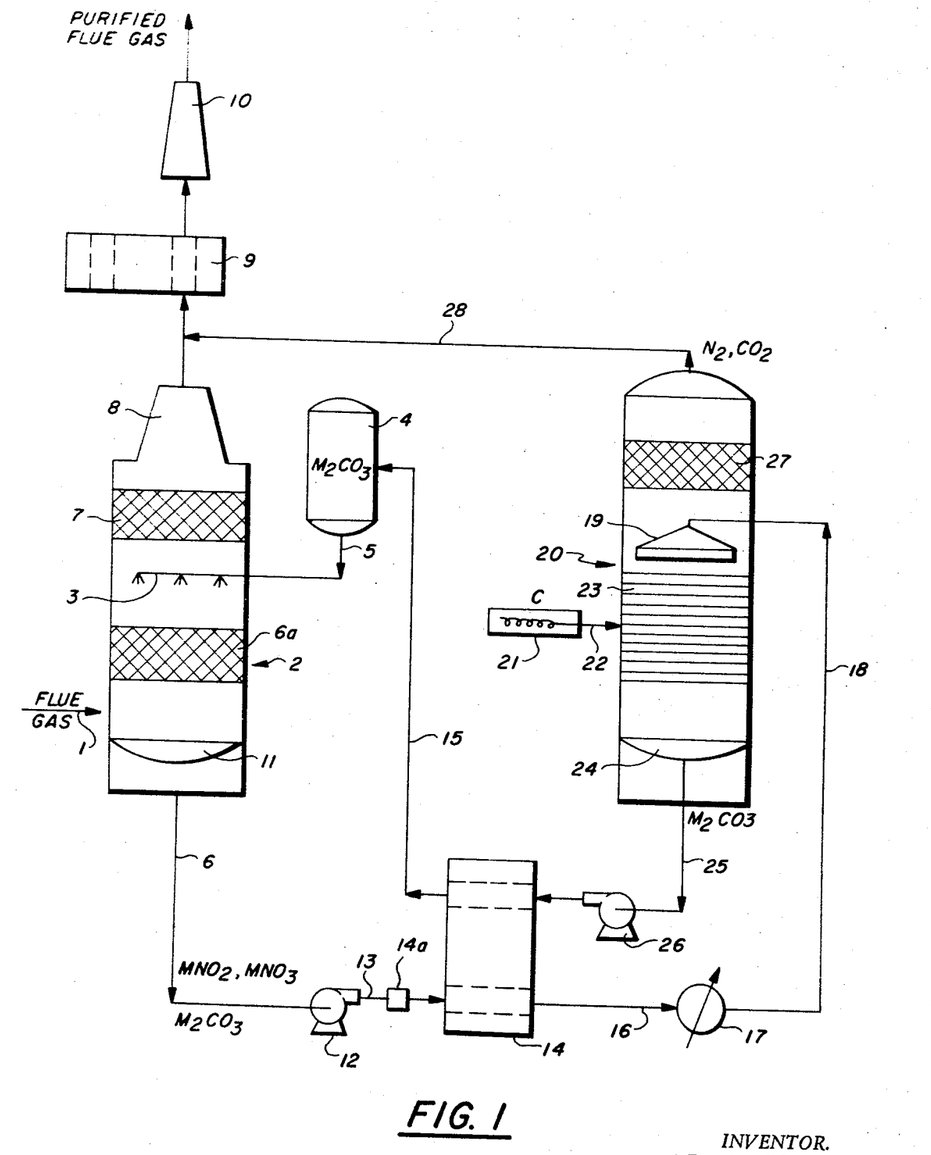
FIG. 1 shows a schematic flow diagram for the removal of nitrogn oxide from exhaust gases, illustrating absorption and regeneration utilizing a separate absorbent column, and wherein the nitrogen values are not recovered.
Figure 2:
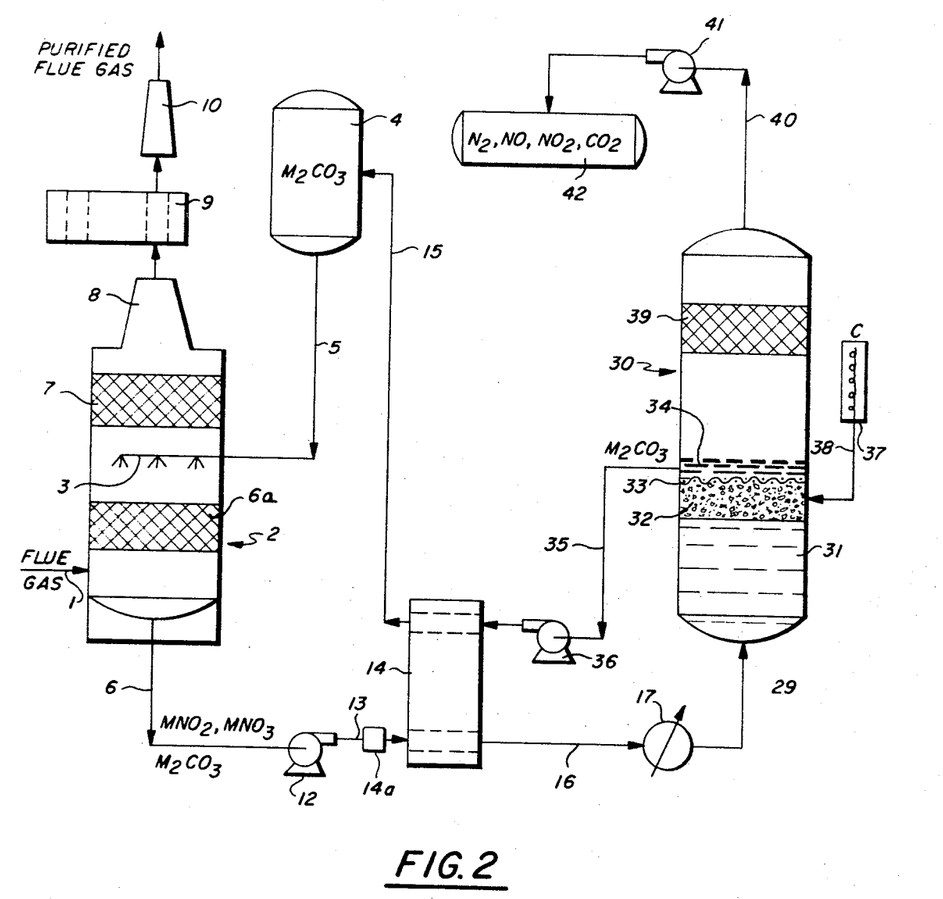
FIG. 2 shows a schematic flow diagram for the removal of nitrogen oxide from exhaust gases, illustrating absorption and regeneration utilizing a separate absorbent column, and wherein the nitrogen values are recovered.
Figure 3:
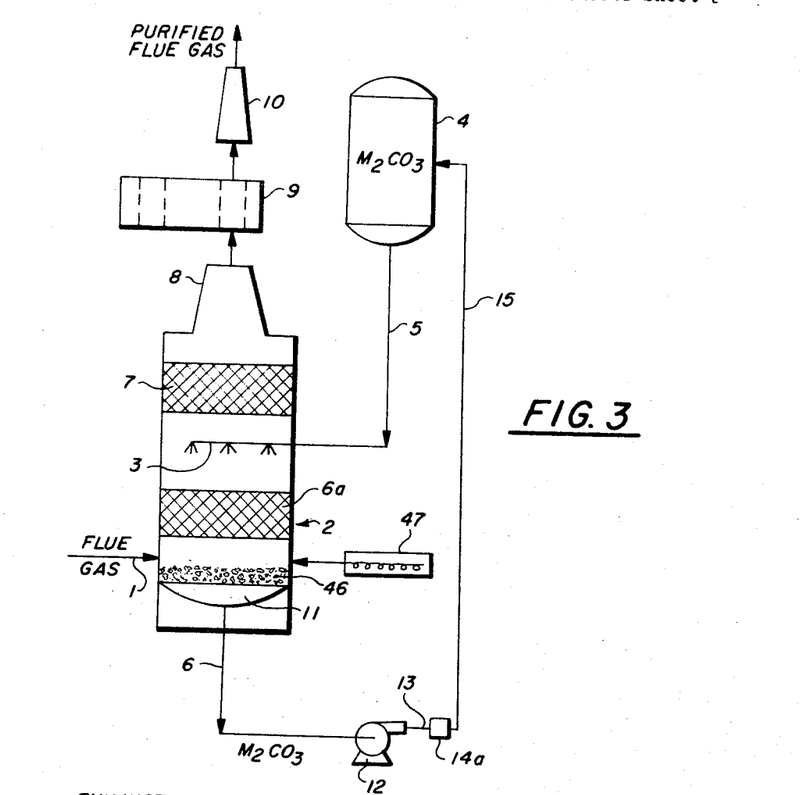
FIG. 3 shows a schematic flow diagram illustrating the removal of nitrogen oxide impurities in a single column wherein the absorption and regeneration occurs.

However, because of the present requirements for an effective, economical process for the elimination of air pollution caused by the emission of nitrogen oxides in industrial stack gases into the atmosphere, recovery of the absorbent is generally required. Therefore, the present invention will be particularly illustrated, as shown in FIGS. 1-3, with respect to the removal of nitrogen oxides from hot combustion gases obtained by the burning of fossil fuels, particularly in electric generating plants, utilizing absorption and regeneration steps.

In U.S. Pats. 3,438,722; 3,438,727; and 3,438,728 issued on Apr. 15, 1969, and assigned to the assignee of the present invention are disclosed processes for removing sulfur oxides from hot combustion gas produced by the burning of sulfur-containing fossil fuels. The present process is of further utility in that it may be coordinated with the processes shown in these patents for the removal of sulfur oxides from hot combustion gases obtained by the burning of sulfur-containing fossil fuels. Thereby, only a single processing plant would be required for the removal of both types of contaminants.

In a representative power plant, the combustion of a ton of an average coal containing 3.4% sulfur typically yields about 400,000 standard cubic feet of stack gases that contain 3000 p.p.m. sulfur dioxide, 30 p.p.m. sulfur trioxide, and 300 p.p.m. nitrogen oxides, principally nitric oxide. Consequently, the economic and efficient removal of such small amounts of sulfur oxides and nitrogen oxides from the much larger volume of flue gas before its discharge into the atmosphere, is difficult. Further, the ultimate disposal of the removed sulfur and nitrogen oxides, by regeneration of the absorbent used and potential conversion of the absorbed sulfur and nitrogen values to usable by-products, also requires solution. The present process directed to the removal of nitrogen oxide compounds present, where coordinated with the related processes shown in the above referred-to patents showing the removal of sulfur oxides, offers the additional advantage of then requiring but a single plant for the removal of both contaminants.

In one preferred aspect of practicing this invention, the hot flue gas is treated with a molten ternary salt mixture of the carbonates of lithium, sodium, and potassium. It is postulated that the NO and $NO_2$ present are converted to a mixture of alkali metal nitrite and nitrate according to the following exemplary equations:

$$6NO + 2M_2CO_3 \rightarrow 4MNO_2 + 2CO_2 + N_2$$

$$2NO + O_2 \rightarrow 2NO_2$$

$$2NO_2 + M_2CO_3 \rightarrow MNO_2 + MNO_3 + CO_2$$

where M denotes a ternary mixture of Li, Na, and K, excess $M_2CO_3$ molten salt being used as carrier solvent.

Suitably, the absorption reaction for $NO_x$ is performed at a temperature where the salt is a liquid, which could be between 350 and 850° C., preferably between 400 and 450° C., approximately corresponding to an available temperature of a typical power plant flue gas and automotive exhaust. The molten product of reaction which contains alkali metal nitrite and nitrate, and generally including sulfite and sulfate, dissolved in molten alkali metal carbonate, is treated with a reducing agent, preferably carbon. At a temperature between 400° and 600° C., and preferably between 450° and 550° C., the nitrates and nitrites are reduced. Higher temperatures up to 850° C. may be required to reduce sulfites and sulfates. The mixed alkali metal carbonates are thereby regenerated and at the same time carbon dioxide and elemental nitrogen are formed. The following exemplary equations serve to illustrate feasible regeneration reactions:

$$4MNO_2 + 3C \rightarrow 2M_2CO_3 + 2N_2 + CO_2$$

$$4MNO_3 + 5C \rightarrow 2M_2CO_3 + 2N_2 + 3CO_2$$

However, where it is desired to recover the nitrogen values as a commercially utilizable by-product, the gaseous products, particularly NO, must be removed rapidly from the melt, preventing reabsorption of NO, so that the following exemplary reactions are believed to be favored:

$$4MNO_2 + 2C \rightarrow 2M_2CO_3 + 2NO\uparrow + N_2\uparrow$$

$$4MNO_3 + 3C \rightarrow 2M_2CO_3 + 4NO\uparrow + CO_2\uparrow$$

The formed nitric oxide is readily utilizable as a feedstock for a nitric acid or fertilizer plant.

Referring to FIG. 1, a hot flue gas obtained from the combustion of a fossil fuel such as coal and at a temperature of about 425±25° C. is admitted by way of conduit 1 to an absorber unit 2. For a typical 1000-mw.(e.) coal-fired electrical utility plant, about 4,650,000 cu. ft./min. flue gas with an NO content of about 0.03 volume percent is generated measured at combustion temperature. The flue gas is passed through a fly ash precipitator (not shown) to remove fine particles entrained therein, prior to entry into the absorber. The precipitator removes most of the fly ash. The molten carbonate will remove the remaining particles. For a 1000-mw.(e.) plant, absorber unit 2 would ordinarily consist of five stainless steel cyclone spray towers in parallel arrangement. These towers are suitably insulated with about 5 inches of high temperature insulation so that the temperature drop within the absorber unit is less than five degrees centigrade.

The flue gas enters tangentially at the base of absorber 2 and travels upwardly with a velocity of about 20 ft./sec. It is contacted countercurrently by a spray of molten carbonate (M.P. below 400° C.) which is discharged through a spray distributor 3 located about 15 feet above the base of the absorber tower. The molten carbonate salt is contained in a storage vessel 4, which is suitably insulated and equipped with a heater to maintain the carbonate salt in a molten state. The molten salt leaves vessel 4 by way of a conduit 5 connected to spray distributor 3 at a flow rate adjusted to provide a controlled amount of nitrite-nitrate content in the effluent molten salt stream leaving the bottom of absorber 2 by way of a conduit 6.

Within the absorber 2 and disposed between the spray distributor 3 and flue gas inlet 1, there is preferably a bed 6a of material such as a metal, preferably, or ceramic refractory that can sustain the high temperatures in the absorber and that is compatible with the molten salt. Preferably, the bed 6a is in the form of a mesh and can comprise such materials as stainless steel, carburized stainless steel, oxidized stainless steel, Monel, Inconel, Nichrome, and low chromium steels. Such metal meshes are preferred, although alumina, magnesia, and other refractories may be used. For example, steel meshes of 5- and 11-mil have been used wherein the mesh had 94 volume percent holes. However, in addition to the mesh form, virtually any form suitable for packed columns could be utilized, such as saddles, Raschig rings, and the like. Stainless steel wool may also be utilized.

The presence of bed 6a is not required to effect removal of the nitrogen oxides. However, it was unexpectedly discovered, as will be pointed out in the specific examples, that when the reaction was carried out in an absorber column, comprised of a previously used stainless steel, improved results were obtained wherein a greater percentage of the nitrogen oxides were removed as compared to using an absorbent column of quartz or previously unused stainless steel. Further investigation then revealed that the reaction between the nitrogen oxides and the molten salts was relatively slow and that the reaction rate could be greatly increased within a given absorber column by the presence of the bed 6a, which is in effect a packed column. The interface between the molten salt and the bed greatly increases the surface area of the molten carbonate and thus provides improved contact between the carbonate and the flue gas thereby enhancing the removal of the nitrogen oxides. The use of such a bed 6a, or packed column, is not required for removal of all of the gaseous impurities. For example, reaction between the molten carbonate salt and lead halides is virtually instantaneous, generally not requiring such a bed to obtain substantial removal of the lead halide impurities.

In practicing the invention, the exhaust gas can first pass through or contact the molten carbonate alone which can remove some impurities therefrom. The packed column can then be disposed above the molten layer serving as both a demister and means for effectively increasing the surface area contact between the molten carbonate and the gas. Alternatively, at least a portion of the packing can be immersed in the molten carbonate so that the contact area is immediately increased when the gas enters the absorber column. Also, for certain applications it may be desirable to provide a preoxidation mesh whereby there is conversion of NO to $NO_2$ in the presence of oxygen on the mesh surface prior to absorption by the molten carbonate. $NO_2$ reacts much more rapidly than does NO with molten carbonate. Thereby, use of a preoxidation mesh facilitates the subsequent absorption.

In addition to the chemcial reaction requirements, the flow rate of the flue gas is also determined by the need for minimizing entrainment and pressure drop in the absorber as well as by the spray distribution pattern of the molten carbonate. Any of various well-known contact methods and equipment, such as a wetted-wall contactor or packed columns, or absorbers containing perforated plates or bubble-cap trays, may be used to insure rapid reaction between the gaseous nitrogen oxides and the molten liquid carbonate. However, the spray technique is generally preferred because of its relative simplicity, high efficiency, and low pressure drop.

After the flue gas contacts the molten carbonate spray, it flows past distributor 3 into a wire demister 7, which is about 1 foot thick and located in the upper section of the absorber tower about two feet above the distributor. The demister serves to remove entrained salt droplets from the flue gas, which is then passed through a conical transition section 8 to minimize pressure drop in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10. Conventional power plant stacks are 400 to 800 feet high so that mixing in the atmosphere will considerably reduce the ground level concentration of the noxious gases ordinarily present in the emitted stack gases. Since the present process is capable of eliminating large fractions of the nitrogen oxide content of the flue gas, the resultant ground level concentration of nitrogen oxides under ideal conditions is substantially reduced.

The molten salt mixture containing alkali metal carbonates in vessel 4 serves as the active absorbent of the present invention. Where diluent salts are present, in amounts up to 90 weight percent, the melting point of the salt mixture containing the alkali metal carbonate absorbent may be as low as about 350° C. Where the melt consists essentially of only the alkali metal carbonates, a ternary mixture consisting of potassium carbonate, lithium carbonate and sodium carbonate is utilized at a reaction temperature between 400 and 600° C. While the individual melting points of the three carbonates fall within the range of 725 to 900° C., a eutectic mixture containing approximately equal amounts by weight of the carbonates of potassium, lithium and sodium has a melting point of about 397° C. (G. J. Janz, "Molten Salt Handbook," Academic Press, Inc., New York, 1967).

Data for the standard free energy of reaction between NO, $NO_2$ and $M_2CO_3$ to form $MNO_2$ and $MNO_3$ as well as the oxidation of NO to $NO_2$ show that thermodynamically these reactions are favored at lower temperatures. Therefore, the absorption of NO is preferably carried out at temperatures as close to the melting point of the mixed carbonate eutectic as is feasible from plant operating and kinetic considerations. Further, in order to minimize equipment corrosion and economize on fuel costs, it is additionally preferred to utilize a molten carbonate-containing mixture having as low a melting point as feasible.

The ternary alkali metal carbonate system has been described by G. J. Janz and M. R. Lorenz in J. Chem. Eng. Data 6, 321 (1961). As described therein, the alkali metal carbonate eutectic melts at 397±1° C. and consists of 43.5, 31.5 and 25.0 mole percent of the carbonates of lithium, sodium, and potassium, respectively. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

The molten salt mixture may include other salts together with the alkali metal carbonates which serve to lower the melting point or even to enhance the absorption of nitrogen oxides. These salts could be present in amounts up to 90 weight percent. As indicated, above, the presence of these salts can lower the melting point to as low as 325° C. For example, such molten salts may include alkali metal nitrates and nitrites, sulfites, sulfides, sulfates, oxides and chlorides. Where only nitrates and nitrites are present with the alkali metal carbonates, and the waste gas contains $CO_2$, these are preferably present in relatively small amounts below 5 weight percent.

As previously discussed, the molten salt could be at a temperature as high as 800° C. for the absorption of $NO_x$. However, the molten salt eutectic can absorb other impurities such as HCl at any temperature at which the vapor pressure of the salt is sufficiently low to make the system operable. Thus, even at 1000° C. or higher, the molten salt would absorb HCl and other impurities.

Since the melting points of the pure alkali metal nitrites and nitrates are considerably lower than those of the mixed alkali metal carbonates, the formation of nitrites or nitrates in the alkali-metal carbonate absorbent decreases the melting point of the resultant solution. Therefore, additional heat input to keep the circulated salt molten is not required. Upon completion of absorption, an alkali metal nitrite-nitrate content of 2–5 mole percent of the resultant molten salt solution is preferred.

The molten nitrite-nitrate-containing carbonate resulting from the reaction between molten carbonate spray and the flue gas is collected in a dished-bottom heated sump 11 of absorber 2. About 5 mole percent of carbonate is converted, the excess of unreacted carbonate and other molten salts present serving as solvent for the nitrite-nitrate formed by the reaction. The nitrite-nitrate-carbonate mixture is pumped from sump 11 of absorber 2 through conduit 6 by way of a pump 12, then through a conduit 13 to a heat exchanger 14. Conduit 13 has a filter 14a therein which removes entrained solids from the molten salt.

As has been indicated, one feature of the herein invention is the removal of solid particulate matter from exhaust gas. Thus, any solids removed by the salt are separated therefrom by the filter 14a. The nitrite-nitrate-carbonate mixture entering heat exchanger 14 is at a temperature of about 425±25° C. Its temperature is increased in the heat exchanger and at the same time the temperature of regenerated molten carbonate feedstock being returned to storage vessel 4 by way of a conduit 15 is lowered. The nitrite-nitrate-carbonate mixture leaves heat exchanger 14 by way of a conduit 16 and passes through a heater 17, which is optionally utilized for further increasing the temperature of the mixture, when required, to about 500±50° C. The mixture leaves heater 17 through a conduit 18 where it is fed into a trickle distributor 19 in a regenerator unit 20. Other liquid-solid contact techniques may also be used. Preferably, a molten carbonate layer is maintained above the carbonaceous bed in order to further react with evolved nitrogen oxide intermediates. The molten liquid trickles therefrom over the solid carbonaceous bed to obtain optimum contact conditions for the regeneration reaction.

The overall chemical reaction in regenerator unit 20 involves concurrent reduction of the alkali metal nitrite-nitrate to elemental nitrogen and regeneration of alkali metal carbonate. This is achieved by the treatment of the alkali metal nitrite-nitrate-carbonate melt with a reducing agent, preferably a carbonaceous material in solid or liquid form so as to provide maximum contact. Carbon in the form of activated carbon is preferred because of its porosity and high surface area. The term "carbonaceous material" includes hydrocarbons which decompose or dissociate to provide the desired reactive carbon. By the term "reactive carbon," reference is made to carbon in an available form for the regeneration reaction. Activated carbon in the form of hard granules or pellets is particularly preferred because of ease of handling and high surface area, as is elemental carbon in the form of coke, charcoal, or carbon black. However, from the point of view of process economics, low cost or waste carbonaceous materials, as obtained from petroleum- and coal-refining processes, are suitable as carbon feedstocks for use in the practice of the present invention. Where a more rapid reaction is desired, an activated carbon is initially utilized, other sources of carbon such as petroleum coke, asphalts, tars, pitches, or the like, then being used subsequently. More than 90 percent of the nitrite-nitrate present is converted by the carbon within about 5 minutes at 500° C., the reaction being substantially complete within about 20 minutes.

Referring again to FIG. 1, a source of carbon 21 is used to provide a carbonaceous material by way of a screw feed 22 to a supported bed 23 in regenerator unit 20. The molten nitrate-nitrite-carbonate mixture trickling from distributor 19 reacts with the carbon in bed 23 at a temperature of 500±50° C. to regenerate alkali metal carbonate and form elemental nitrogen and carbon dioxide. The molten alkali metal carbonate, including both regenerated and carrier carbonate, is collected in a sump 24 at the base of regenerator 20, from where it is fed by way of a conduit 25 by means of a pump 26 to heat exchanger 14, where it loses heat, and then is returned to storage vessel 4 by way of conduit 15. The reconverted carbonate is then recycled to absorber 2 by way of conduit 5.

The gas mixture produced in the regeneration reaction consists principally of carbon dioxide and elemental nitrogen. This gaseous mixture passes through a demister 27, which removes entrained liquid particles, and leaves regenerator 20 by way of a conduit 28 where it joins the stream of hot purified flue gas entering heat exchanger 9, followed by discharge to the atmosphere through power plant stack 10.

For certain applications, it may be economically desirable during the regeneration reaction to recover the nitrogen values otherwise lost by discharge to the atmosphere. This embodiment of the invention for the recovery of nitrogen values is illustrated in FIG. 2, similar numerals being used for parts corresponding to those in FIG. 1. Referring to FIG. 2, the molten nitrite-nitrate-carbonate mixture leaving heater 17 is fed by way of a conduit 29 to the base of a regenerator unit 30, passing upwardly through a molten alkali metal carbonate layer 31. A carbon layer 32 floats on the heavier molten carbonate layer 31 and is restrained by a metal screen 33, preferably of stainless steel. A relatively thin alkali metal carbonate layer 34, passing through the screen, consists of regenerated and carrier carbonate and is fed by way of a conduit 35 by means of a pump 36 through heat exchanger 14 and returned to storage vessel 4 by way of conduit 15 for reuse in the process. A source of carbon 37 is used to provide the carbonaceous material of layer 32 by way of a screw feed 38.

Where essentially complete conversion of alkali metal nitrite and nitrate to nitrogen is desired during the regeneration reaction, as illustrated in FIG. 1, the molten absorbent solution is maintained in relatively long contact with the carbonaceous material by being trickled through a bed of this material. However, where it is desired to recover the nitrogen values in the form of nitrogen oxides from the molten absorbent, as shown in FIG. 2, a relatively thin layer of carbon is used in the contact bed and the molten carbonate absorbent is drawn therethrough rapidly. Where desired, vacuum may be applied. Also, the regenerated alkali metal carbonate is relatively rapidly removed as formed so as to prevent undesired absorption of the nitrogen oxides therein. Under these conditions, it is postulated that the following exemplary reactions are favored, although the actual reactions that occur are more complex:

The gas mixture that is formed consists principally of nitric oxide, nitrogen, and carbon dioxide, the relative proportions of the gases in the mixture depending upon the reaction conditions. NO$_2$ may be present in relatively minor amounts. This gas mixture passes through a demister 39, which removes entrained liquid particles, and leaves regenerator unit 30 by way of a conduit 40 where it is pumped by means of a pump 41 to a storage vessel 42 of a nitric acid production plant. The formed gaseous mixture is a suitable feedstock for ready conversion to nitric acid or other marketable nitrogenous products by conventional processing procedures.

Turning now to FIG. 3, there is seen a schematic diagram wherein regeneration can occur in the absorber unit. Thus, the same absorber as shown in FIGS. 1 and 2 is disclosed and utilized. However, in this embodiment, carbonaceous material 46 which can be of the same type utilized in the regenerators of FIGS. 1 and 2, such as fluidized coke or green petroleum coke, is supplied by way of a screw feed 47 just above the heated sump 11 such that the carbonaceous particles will tend to float on top of the molten salt. The carbonaceous material fed will additionally be restrained by the packing 6a and thus be confined to the area between the packing 6a and the sump 11.

The nitrite and nitrate compounds formed in the absorber are thus converted in the presence of a carbonaceous material to the regenerated molten carbonate, which leaves the absorber through conduit 6 and is recirculated by pump 12 through filter 14a back to the storage vessel 4. Any minor amounts of unconverted nitrite or nitrate are of course additionally recirculated and will not be harmful in any way to the process, since it will reenter the absorber through the spray unit 3 and be converted upon contact with the carbonaceous material 46 in the absorber. Of course, any NO that might be given off from the reaction of the nitrite or nitrate with the carbon will pass up through the mesh 6a and again contact the sprayed molten salt and be converted to the nitrite-nitrate and thus be prevented from leaving the absorber unit.

Though it would appear that a single absorber having regenerative capability by feeding carbonaceous material thereto, as seen in FIG. 3, would be advantageous over a separate absorber and regenerator, several factors should be considered in weighing one version against the other. As can be appreciated, residence time for contact between the nitrite-nitrate and the carbonaceous material can be increased when utilizing a separate absorber unit, thus possibly providing under given conditions a more efficient regeneration to the carbonate. In addition, the reaction between the carbonaceous material and the nitrite-nitrate to effect regeneration is more rapid at 500° C., as has been indicated as the preferred temperature in the separate regenerator unit, as seen in FIGS. 1 and 2. Alternatively, the preferred temperature in the absorber unit is 425° C.±25°, which is significantly lower than the preferred temperature for regeneration. Thus, the regenerative process will not be as rapid in the absorber unit maintained at the lower temperature conditions.

REMOVAL OF HALIDES AND HALOGENS AND REGENERATION OF CARBONATE-HALIDE MIXTURES

Halides and halogens can be found in industrial waste gases. As will be explained, lead species, particularly lead halides, are particularly prevalent in automotive exhaust. Most all types of gasolines utilized in internal combustion engines contain lead additives to improve their antiknock properties. Tetraethyl lead and tetramethyl lead are most commonly used for this purpose. Additionally contained with these additives are organic halogen compounds, such as ethylene chloride and ethylene bromide, which act as scavengers for solid lead deposits in the engine to form volatile lead halides which are expelled in the combustion products. The molten carbonate of the herein invention is believed to react with lead halides in accord with the following exemplary reaction to convert the lead halide present to alkali metal halide:

where X refers to the halide ion and M refers to the Li, Na or K ion and (g) and (l) refer to gaseous or liquid states. $PbX_2$ can be present as the solid, liquid or gaseous material.

It is believed that the lead oxide formed in the foregoing reaction will tend to react with the metal from the container for the molten salt, yielding a metal oxide and lead, in accord with the following exemplary reaction:

$$PbO(l) + M^*(s) \rightarrow M^*O(s) + Pb(s)$$

where M* refers to a metal more reactive in this environment than lead, such as iron, nickel, chromium or cobalt, and (s) refers to the solid state. The above reaction could produce a protective layer of lead on the metal surface containing the molten carbonate and thus could inhibit further corrosion. Thereafter the lead oxide would remain as a sludge at the bottom of the carbonate reaction. Though the primary concern particularly with automobile exhaust is the removal of lead halides, the molten carbonate will also remove any halogens present from flue gases or exhaust, by the same general foregoing reaction where an alkali metal chloride is formed. Of course, there would be not metal oxide present if only a halogen or acid halide were being removed.

The halides mostly present in gasoline exhaust are chlorides and bromides. However, fluorides would also be removed if present. If there is an excess build-up of the lead oxide formed, it will settle to the bottom and can be removed as a sludge. Since lead oxide is only sparingly soluble in the molten carbonate, very little will be carried with it in a circulating system and thus presents no problem as far as contamination and necessity for immediate removal. However, it might be desirable in some instances to regenerate the alkali metal halide to the carbonate salt concurrent with recovery of lead values, when desired. The regeneration of the halides depends upon the halide removed. Since chloride is the most prevalent form of halide, it will be discussed first. Three different techniques could be utilized for the removal of the chloride. These include (1) separation of solid phase, (2) an acidification technique and (3) distillation of halides from the melt. Each will be briefly discussed separately below.

(1) Separation of solid phase

As indicated, the first technique that can be utilized for regeneration of the carbonate salt involves separation of a solid phase. It has been found experimentally that when greater than 5 weight percent of sodium chloride is added to the eutectic carbonate of this invention, a solid chloride-rich phase separates or floats to the surface of the melt at the temperatures below 500° C. if separation is allowed. Above 500° C., the sodium chloride is dissolved in the melt. Thus, by cooling the melt or keeping the melt to a temperature below 500° C., one can separate, by filtration, the solid chloride phase. Chemical analysis of this phase indicates that the solid material is predominantly a mixture of sodium chloride and potassium chloride with some carbonate and lithium present as an impurity. Thus, any chloride present, whether from a pure halogen source from an acid halide, from lead chloride or other halogen source, when passed through the melt should form such a chloride-rich solid phase when its level exceeds 5 weight percent of the melt composition. The carbonate and lithium impurity could be separated from the filter cake if desired by selective precipitation as a bicarbonate.

(2) Acidification

The second technique for removing chlorides involves an acidification process. The chloride-rich solidified salt could be treated with sulfuric acid to produce hydrochloric acid and alkali metal sulfates. The alkali metal sulfates could then be reduced to sulfides and regenerated to carbonates in the manner described in U.S. Patent 3,438,728.

(3) Halide distillation

Finally, as a third regenerative process the chlorides could be distilled from the melt in accord with the following exemplary reaction:

$$MeO(s) + 2MCl(l) + CO_2(g) \rightarrow M_2CO_3(l) + MeCl_2(g)$$

where: Me is a metal.

In the above reaction a non-volatile metal oxide, MeO, that forms a volatile halide is added to the melt. Carbon dioxide is added to drive the reaction to completion so that the volatile metal chloride can be distilled therefrom. The metal halide can then be hydrolyzed or treated with slaked lime to regenerate the metal oxide if desired.

Fluorides can be subjected to the three foregoing techniques set forth for the regeneration of the carbonate salt when halides are removed. However, in addition to the three foregoing techniques, fluorides can be separated from the melt by dissolving the melt in water. An insoluble lithium fluoride will result, which can be filtered from the solution. The sodium-potassium carbonate can be recovered from solution by precipitation with bicarbonates. The lithium can be recovered by treatment with slaked lime. Iodides can be oxidized and distilled from the melt.

REMOVAL OF METAL OXIDES AND REGENERATION OF CARBONATE-OXIDE MIXTURE

As indicated, metal oxides are also contemplated to be removed by the molten carbonate mixture of the invention. Thus, if the oxide is insoluble in the melt, simple filtration can remove it therefrom. However, if the metal oxide, such as arsenic oxide, is soluble in the melt, then it can be removed by reduction and distillation as the volatile metal. Another class of metal oxides, i.e., those that react with alkali metal carbonates at higher temperatures, such as silica ($SiO_2$) in accordance with the following exemplary reaction:

$$M_2CO_3(l) + SiO_2(s) \xrightarrow{M_2CO_3} M_2SiO_3(l) + CO_2(g)$$

can be separated by dissolution in water, acidification and filtration as indicated in the exemplary reaction:

$$M_2SO_3(l) + H_2SO_4(l) \rightarrow M_2SO_4(l) + SiO_2(s) + H_2O(l)$$

then regenerate the carbonate from the sulfate as in U.S. 3,348,728. Most of the oxides removed by the molten salt originate from fly ash and thus are in solid particulate form. However, industrial waste gases do produce some volatile amphoteric oxides, such as arsenic oxide and zinc oxide. As indicated above, industrial waste gases often contain organic sulfur compounds such as RHS, $R_2S$, COS, $H_2S$, $SO_2$, $SO_3$, $H_2SO_4$ and $H_2SO_3$, where R refers principally to methyl or ethyl groups but might refer to another organic group. These materials will react with the molten carbonate mixture of the invention to form sulfides, sulfites, sulfates, thiocarbonates and thiosulfates. The alkali metal carbonate can then be regenerated in accord with any of the methods set forth in U.S. Patent 3,438,728.

REMOVAL OF PHOSPHORUS COMPOUNDS AND REGENERATION OF CARBONATE

The final class of materials that can be removed by the salt of the herein invention involves phosphorus compounds, such as phosphorus oxide, halides, oxyhalides, acids, or organic compounds. The reaction involved for the removal of such phosphorus compounds is believed to be:

$$P_2O_5(s) + 3M_2CO_3(l) \rightarrow 2M_3PO_4(l) + 3CO_2(g)$$

The molten alkali metal carbonate of the invention can then be regenerated by two processes: The phosphorus compounds can be removed from an aqueous solution of the melt by treating the melt with slaked lime. The insoluble calcium phosphate, as well as the excess slaked lime, can then be filtered from the solution and the alkali metal carbonate can be recovered from solution by precipitation as the bicarbonates (sodium and potassium) or carbonates (lithium).

An additional method for regeneration of the alkali metal carbonate when phosphorus compounds are removed involves treating the phosphorus-rich melt or filter cakes in a manner similar to that utilized in phosphate rock-fertilizer plants. This would involve acidification with sulfuric acid, removal of the phosphoric acid generated, and then regeneration of the alkali metal sulfates as disclosed in U.S. Patent 3,438,728.

REMOVAL OF SOLID PARTICULATE MATTER

The alkali metal molten carbonate of this invention has been found to additionally remove small particulate matter from exhaust gases. In industrial waste gases, the solid particulate matter is often referred to as fly ash. Typical fly ash contains particles of $SiO_2$, $Al_2O_3$, $Fe_2O_3$, $TiO_2$, $MgO$, and $CaO$. In addition, $K_2O$ and $Na_2O$ have also been identified in fly ash. Most all of the particles found in fly ash will be under 60 microns in size. Often it has been found that the majority of the particle sizes are under 30 microns, and in fact, in many instances under 5 microns in size. It is believed that the molten salt removes the solid particulate matter by a wetting action, trapping the solid material in the molten salt. The solid materials found in the industrial waste gas when in the form of metal oxides, as previously indicated, do not react with the molten salt at normal absorption temperatures and are removed from the salt by filtration utilizing a filter 14a as shown in the figures. Thus, in addition to removing the various metal oxides, the molten carbonate will remove virtually any particulate substance in waste gas which includes carbonaceous materials often found particularly in automotive exhaust, as well as solid lead halides, as has been previously indicated.

REMOVAL OF IMPURITIES FROM EXHAUST GAS GENERATED BY INTERNAL COMBUSTION ENGINES

As previously indicated, the herein invention applies to the removal of impurities both from industrial waste gases and the gas generated by internal combustion engines. For an internal combustion engine, the carbonate salt of the invention can be disposed within a muffler unit wherein the exhaust gases are forced into contact with the salt. As will be explained, when the exhaust gas contains nitrogen oxide impurities and carbon monoxide, CO, then the nitrites and nitrates formed can be regenerated.

Figure 4:
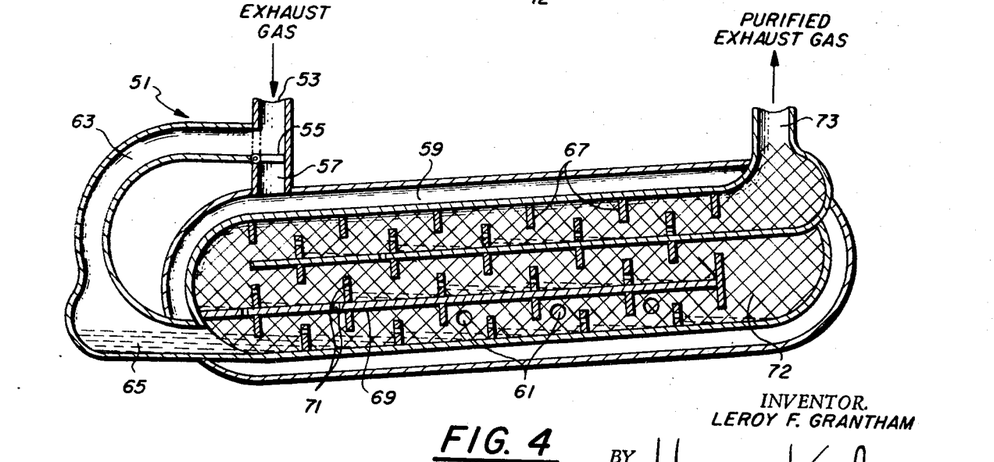
FIG. 4 is a cross-sectional plan view of a muffler for utilizing the process of this invention.

Turning now to FIG. 4, there is seen a muffler unit 51 wherein the exhaust gas in the manifold of an automobile engine is fed directly into an opening 53 thereof. When the automobile engine is first started, the exhaust gas is cold, and a thermostatically controlled valve 55 is initially in closed position (phantom view in FIG. 4). The cold exhaust gas is then directed through a passage 57 which feeds into an outer jacket 59 of the muffler, and then by way of a series of bypass openings 61 into the main body of the muffler. Thereby the exhaust gas, which is relatively free of nitrogen oxides in the cold state, bypass the pool of the alkali metal carbonate contained in the muffler, and passes through the baffled passages of the muffler to the atmosphere. Since the ternary alkali metal carbonate eutectic has a melting temperature of about 395° C., the absorbent is in the solid state at room temperature.

Under conditions of normal automobile operation, the exhaust gas may attain a temperature as high as 800° C. Therefore, upon operation of the engine and circulation of the exhaust gas in outer jacket 59, the absorbent contained in the muffler readily attains a molten state. At the same time, valve 55, which is suitably a thermostatically controlled butterfly valve, assumes an open position (solid line view), and the hot exhaust gas containing nitrogen oxides is diverted through passage 63 into a main body of molten absorbent 65. The muffler is suitably shaped to provide a desired pool of molten carbonate for contacting the hot exhaust gas. Since the muffler unit is also inclined from a horizontal position, the gas passing through the baffle passages of the muffler unit comes into gradually decreasing contact with molten carbonate mixture, also retained against a series of fins 67 in the baffled passages. Thereby loss of molten carbonate from the muffler unit is minimized. The baffle plates 69 and fins 67 are provided with drain holes 71 for return of the absorbent to the main body of molten carbonate 65.

As has been indicated, in the muffler there is preferably disposed on the upper surfaces of baffle plates 69 a packing 72 of stainless steel wire mesh, or any of the other types of materials disclosed in copending application S.N. 13,-245. The mesh is provided on the top surface of the baffle plates 69 so as to be wetted by the molten salt or absorbent 65. The presence of the packing 72 has been found to greatly aid the absorption of the nitrogen oxides and greatly improved results can be obtained when this material is present, as has been indicated in the aforementioned copending application. Furthermore, the mesh packing greatly enhances the melt surface area which will aid in removing the last trace of lead particulates from the exhaust gas.

Essentially the nitrogen oxide absorption and regeneration reactions occur simultaneously: the mixed alkali metal carbonate serves as absorbent and the carbon monoxide contained in the exhaust gas serves as regenerant for the formed alkali metal nitrite and nitrate, in accordance with the following exemplary reactions. The actual reactions involved, however, could be more complex.

$$2NO + 2CO \longrightarrow 2CO_2 + N_2 \text{ (overall reaction)}$$

Thereby the exhaust emitted from an exit passage 73 of muffler 51 is substantially free from the noxious nitrogen oxides originally present.

The following detailed examples illustrates the practice of this invention but are not intended as limitations thereof.

EXAMPLE 1

Absorption of nitric oxide

A $CO_2$-NO gas stream containing 10 vol. percent NO was bubbled through a one-inch layer of molten carbonate absorbent consisting essentially of a ternary eutectic mixture containing approximately equal amounts by weight of the carbonates of potassium, lithium, and sodium and having a melting point of about 400° C. The molten alkali metal carbonate eutectic was maintained at about 425° C. in a previously used stainless steel vessel, and the gas was bubbled therethrough at a flow rate of 900 cc./min. Analysis of the effluent gas stream showed that about 60 vol. percent of the NO initially present in the gas mixture was removed by the absorbent solution.

The use of a quartz reaction vessel or of a previously unused stainless steel vessel resulted in a decrease in the efficiency of NO removal.

EXAMPLE 2

Absorption of NO in simulated flue gas

A run was made simulating plant conditions and utilizing a small-bubble scrubbing action for the removal of nitrogen oxides from flue gas. The synthetic flue gas consisted of, in volume percent, He 80, $CO_2$ 17, $O_2$ 2.6, and NO 0.1–1. Helium was substituted for nitrogen in the feed gas in the order to facilitate subsequent gas chromatographic analysis. The reaction vessel used was similar to that of Example 1. However, the gas was bubbled through about 3 inches of molten alkali metal carbonate eutectic and passed through several layers of stainless steel 304 wire mesh in the process. This scrubbing action by the stainless steel mesh provided a stream of small-size bubbles and increased melt-gas contact compared with that occurring in Example 1. Based on melt analysis more than 94 wt. percent of the nitrogen oxides originally present in the gas stream were removed by the melt.

EXAMPLE 3

Absorption of NO in absence of oxygen

An absorption run similar to Example 2 was made in which the feed gas consisted of 99 vol. percent $CO_2$ and 1 vol. percent NO, no oxygen being present. The gas was bubbled through a 3-inch layer of molten carbonate eutectic at 430° C., a stainless steel mesh being used to increase melt-gas contact. Based on gas analysis, 67 vol. percent of the NO initially present was removed from the gas stream.

EXAMPLE 4

Absorption of NO in presence of nitrite and nitrate

The test equipment described in Example 2 was used to determine the removal of NO from a gas stream by molten alkali metal carbonate eutectic as a function of nitrate and nitrite composition of the melt. Alkali metal nitrite and nitrate would be formed during the absorption reaction and present in the melt during the absorption step. The run conditions and melt analyses are shown in Table I. The flow rate was 100 cc./min. for all runs.

TABLE I

| Run number | Temp., °C. | Gas composition (vol. percent) | | | | Melt composition (wt. percent) | | | Percent $NO_x$ removal |
|---|---|---|---|---|---|---|---|---|---|
| | | $CO_2$ | $N_2$ | NO | $O_2$ | $M_2CO_3$ | $M_2NO_2$ | $M_2NO_3$ | |
| 1 | 455 | 18 | 79 | 1 | 2 | 97 | 2.1 | 1.0 | 73 |
| | | | | | | 97 | 2.4 | 0.5 | 61 |
| | | | | | | 97 | 2.6 | 0.5 | 60 |
| | | | | | | 95 | 2.9 | 1.8 | 58 |
| 2 | 390-500 | 99 | | 1 | | 90 | 10.0 | | 5 |
| 3 | 390-500 | 99 | | 1 | | 0 | 100.0 | | None |

It is noted that where only nitrite was present and carbonate was absent from the melt composition, a reversal of the absorption reaction occurred, $NO_x$ being generated rather than absorbed.

EXAMPLE 5

Absorption of nitrogen dioxide by molten carbonate

A nitrogen carrier gas containing varying initial amounts of nitrogen dioxide (5 to 20%) was bubbled through a molten alkali metal carbonate ternary eutectic mixture at 450° C. at a rate of 60 cc./min. in an absorption apparatus similar to that described in Example 2. The results are shown in Table II.

TABLE II

| Feed gas composition, vol. percent $NO_2$ | $NO_2$ removed (percent) | Carbonate converted (percent) |
|---|---|---|
| 20 | 50 | 1.2 |
| 18 | 50 | 2.4 |
| 13 | 54 | 3.2 |
| 9 | 50 | 3.8 |
| 5 | 67 | 4.1 |

These results indicate that even with 4% conversion of the carbonate, the extent of $NO_2$ removal from the gas stream is essentially unchanged.

EXAMPLE 6

Nitric oxide removal in a stainless steel wool-packed reactor

A small reactor was packed with 100 cc. of fine stainless steel wool. A molten alkali metal carbonate was pumped to a point above the wool at the top of the reactor and allowed to drain down and filter through the steel wool, keeping the steel wool continuously wetted with the carbonate. Helium carrier gas containing 980-3100 p.p.m. of nitric oxide, 0–10 percent carbon dioxide, and 0–2 percent oxygen was passed through the reactor at a temperature range of 450 to 585° C. and at a rate of 3 to 7 liters/min. (STP). Thus conditions were varied widely during the experiment to determine the effect of carbon dioxide and oxygen presence upon the nitric oxide removal, as well as the effect of temperature, residence time, flow rate, and the like. The best removal, which was 82% of the nitric oxide, occurred at conditions of 2600 p.p.m. NO, 10 percent $CO_2$, and 2 percent $O_2$ in the gas stream, which had a residence time of 0.8 second in the reactor. In a gas mixture containing 2050 p.p.m. NO, 5% $CO_2$, and 0.5% $O_2$ with a residence time of 0.36 second in the device, it was found that 61% of the NO was removed.

A controlled experiment was run in which the same reactor was packed with unwetted stainless steel wool of the same type used above, that is, there as no carbonate present in the reactor. No nitric oxide was removed, indicating that for the foregoing reaction conditions, the presence of molten carbonate salt is required for nitric oxide removal.

EXAMPLE 7

Carbon regeneration of nitrite-containing carbonate melt

A mixture of 90 gms. of the ternary eutectic of the mixed alkali metal carbonates and 10 gms. of sodium nitrite were placed in the lower end of a stainless steel reaction tube. Five gms. of charcoal was retained at the upper end of the reaction vessel on stainless steel screens. The reaction vessel was placed in a furnace and degassed while being brought to a temperature of 500° C. The contents were then mixed by rotating the furnace. The reaction was found to proceed in accordance with the following exemplary equations:

$$4MNO_2 + 3C \rightarrow 2M_2CO_3 + 2N_2 + CO_2$$

$$4MNO_2 + 2C \rightarrow 2M_2CO_3 + 2NO + N_2$$

The results, shown in Table III below, indicate that while both the above reactions occur, the NO initially evolved in the second reaction is reabsorbed and reduced if it remains in contact with the melt. Thus, either NO or $N_2$ may be obtained depending upon the reaction conditions selected.

TABLE III

| Time (hr.) | Pressure (p.s.i.g.) | Gas composition (vol. percent) | | | |
|---|---|---|---|---|---|
| | | $N_2$ | $CO_2$ | NO | $N_2O$ |
| 1.0 | [1] 220 | 65 | 20 | 15 | Trace |
| 1.7 | [2] 240 | 65 | 20 | 15 | Trace |
| 5.0 | [2] 25 | 66 | 33 | 1 | Trace |
| 24.0 | 6.5 | 77 | 23 | 0 | 0 |

[1] The melt temperature increased to 550° C. when salt and charcoal were contacted.
[2] At indicated pressures, gas was evolved from vessel until pressure of 0 p.s.i.g. was obtained before resuming run.

Melt analysis at the conclusion of the test indicated that about 0.01% by weight of nitrite or nitrate remained. Thus the reduction was 99.9% complete.

EXAMPLE 8

Carbon reduction of nitrate in carbonate melt

Ninety grams of the ternary alkali metal carbonate eutectic and 10 gms. of sodium nitrate were contacted with 9 gms. of charcoal at a temperature of 500° C. in the manner described in Example 6. Following contact, the temperature of the melt and charcoal rose to 550° C., the internal pressure of the reaction vessel increasing to 450 p.s.i.g. within 5 minutes. The reaction was essentially complete in 20 minutes, the maximum temperature attained being 575° C. at a maximum internal pressure of 515 p.s.i.g. The results obtained are shown in Table IV.

TABLE IV

| Time (min.) | Temp. (° C.) | Pressure (p.s.i.g.) | Gas composition (vol. percent) | | |
|---|---|---|---|---|---|
| | | | $N_2$ | $CO_2$ | NO |
| 0 | 500 | 0 | | | |
| 5 | 550 | 460 | | | |
| 20 | 575 | 515 | 38 | 59 | 3 |
| 90 | 500 | ¹ 480 | 41 | 57 | 2 |
| 180 | 500 | 30 | 42 | 57 | 1 |

¹ Pressure decrease to 30 p.s.i.g. before resumption of run.

Analysis of the melt after the run indicated that 0.2 wt. percent nitrate and nitrite remained; thus the reduction to elemental nitrogen was substantially complete (more than 97%) in 20 minutes.

The composition of the gas indicated that the major reaction was as follows:

$$4MNO_3 + 5C \rightarrow 2M_2CO_3 + 2N_2 + 3CO_2$$

this equation corresponding to the observed $N_2:CO_2$ ratio of 2:3. The minor amount of NO present is considered to be formed by the following reaction:

$$4MNO_3 + 3C \rightarrow 2M_2CO_3 + 4NO + CO_2$$

EXAMPLE 9

CO regeneration of carbonate melts containing nitrite and nitrate

Five grams each of $NaNO_2$ and $NaNO_3$ were dissolved in 100 grams of molten alkali metal carbonate. This melt was placed in a stainless steel reaction vessel containing stainless steel mesh packing. A gas containing (volume percent) 78 He, 20 $CO_2$, 1–2 CO, and about 1% air was bubbled through the above alkali metal carbonate melt at a temperature of 450° C. and at a rate of 100 cc./min. for 4 hours. The concentration of nitrite was reduced from 3.05 to 2.88 wt. percent at this temperature. Reduction was continued for two more hours at an increased temperature of 550° C. During this period, the nitrite content of the melt was further decreased to 2.59 wt. percent. The nitrate content of the melt was decreased from 2.97 to 2.88 wt. percent during the period when the melt was maintained at 450–550° C.

The foregoing results indicate the CO will reduce nitrite and nitrate at 450–550° C. At 450° C. about 20% of the CO is utilized; at 550° C. 50% of the CO is utilized for the reduction. Since automotive exhaust gas contains about 0.15% NO and 1.5% CO, only about 10% utilization of the CO is required to eliminate all of the NO present in the exhaust gas.

EXAMPLE 10

Lead halide absorption in molten carbonate eutectic melt

This example illustrates the removal of lead halides by the molten carbonate salts used in the invention. A system was utilized that permitted $PbCl_2$ to be volatilized and swept through molten carbonate, which was contained in a stainless steel reaction vessel. Lead chloride, which melts at 501° C. and has a vapor pressure of 1 mm. at 547° C., was heated to 575° C. and swept into the molten carbonate melt at 500° C., with argon flowing at 600 milliliters per minute. After 2½ hours, the $PbCl_2$ transpiration vessel was cooled and weighed. It was found that 2.5 grams had been volatilized. The carbonate melt was sampled by immersing a quartz tube into the material and withdrawing collections of the molten liquid for analysis. The remaining material was then poured into a stainless steel pan and analyzed. In addition, the outlet lines from the steel bomb were leached with dilute HCl; however, no lead was detected in the washings. The results of the lead found in the quartz tube samples are given in Table V.

TABLE V

| Quartz tube samples | $M_2CO_3$ taken (g.) | $PbCl_2$ found (mg.) | Concentration $PbCl_2$ absorbed (wt. percent) |
|---|---|---|---|
| #1 | 3.48 | 85 | 2.64 |
| #2 | 2.67 | 47 | 1.90 |
| Melt sample | 61.6 | 1,320 | 2.14 |
| Washings from bomb | | 754 | |
| Washings from $PbCl_2$ container | | 92 | |

NOTES:
Total $PbCl_2$ found, 2.297 grams.
Percent $PbCl_2$ recovered, 2.297/2.5 g.×10² = 92%.
Percent $PbCl_2$ removed from gas stream by molten carbonate:

As can be seen from the above results, the utilization of the molten carbonate provided an extremely effective means for the removal of the lead chloride since 92% of the material volatilized was recovered.

In a second experiment performed under similar conditions where the lead chloride was volatilized at a rate of 13 mg./hr. all of the lead was recovered at the conclusion of the test. The results of this test indicated that 100% of the lead was removed from the gas stream by the molten salt.

In a third experiment 10 grams of lead chloride were added to 100 grams molten carbonate. Air was bubbled through the 700° C. molten mixture at a rate of 25 s.c.f.h. for three hours. At the conclusion of the test 10 grams of lead were found in the molten salt container indicating that once the lead chloride is absorbed by the molten salt it cannot be reentrained even at high gas purge rates and high temperatures.

EXAMPLE 11

HCl absorption in molten carbonate

A gaseous mixture of helium as an inert carrier containing HCl was sequentially bubbled through 3⅓ inches of molten alkali metal carbonate—35 weight percent sulfite melt at 550° C., and then concentrated aqueous sodium hydroxide solution at room temperature. The helium flow was maintained at 1400 cc./min. while the hydrogen chloride flow was varied from 6 to 26 cc./min. The test lasted for approximately 30 minutes. At the end of the period, it was found that about 10 percent of the carbonate was converted to chloride. A silver nitrate test was performed on the acidified solution of the sodium hydroxide. No chloride was detected in this solution. Thus, there was complete (100%) absorption of the HCl in the molten carbonate melt. Upon cooling the melt, the NaCl-KCl rich white phase solidified at the surface.

The above test was repeated utilizing a melt having the same carbonate-sulfite composition. However, in this run, pure HCl gas was bubbled through 1 inch or 100 cc. of the melt at 440° C., at a rate of 20 cc./min. Within 10 minutes, white crystals of NaCl-KCl began forming near the surface of the melt. Based upon a negative silver-nitrate test for chloride in the sodium hydroxide scrubber, 100% of the chloride was obviously absorbed by the molten salt.

EXAMPLE 12

Removal of particulate matter from exhaust gases

Four tests were run to determine the fraction of particulates removed by a molten carbonate melt. Particulate materials tested were fly ash, talc, powdered fluidized-coke, and powdered graphite. One test was made with each of the finely divided particulates. The product sizes in each test ranged from 5 microns to less than 0.1 micron. Particulates were then entrained in a gas stream flowing at 300 cc./min. by injecting them slowly at the rate of less than 100 mg./min. into the gas with a syringe. The gas stream containing the entrained particles was then bubbled through 3¼ inches of the molten carbonate eutectic of this invention, maintained at a temperature of 500° C. The off-gas was then bubbled through water. At the conclusion of each run, a material balance was determined by dissolving the molten carbonate in dilute acid and washing the scrubber with dilute acid. The resulting solutions were combined and then filtered through a fine filter paper which was subsequently dried and weighed. The results are given in Table VI.

TABLE VI

Removal of particulates in a molten carbonate scrubber

| Particulates: | Percent removed in scrubber* |
|---|---|
| Fly ash | **>95 |
| Talc | >98 |
| Fluidized coke | ~10 |
| Charcoal | ~10 |

*100% recovery was not obtained, therefore the lower limit is given. No weighable quantities of fly ash were found in the off-gas.
**Adjusted for the amount of fly ash dissolved in dilute acid under similar conditions.

The molten carbonate appeared to wet the fly ash and talc particles but did not wet the fluidized coke or charcoal particles, as can be seen from the low amount of those materials removed. Thus, most of the fly ash and talc was found at the bottom of the reaction vessel, while the limited amount of carbonaceous particulates found in the absorption chamber were floating on the surface of the melt. The results, as indicated in the table, clearly indicate that the melt has to wet the particulates. Otherwise, they will float to the top of the carbonate and are reentrained at high gas flow rates.

A subsequent experiment was conducted in order to attempt to effectively remove fluidized coke and charcoal particles in the carbonate scrubber. It was found that the coke and charcoal had chemisorbed gases; it is postulated these chemisorbed gases prevented effective gas-melt contact. If chemisorbed gases are expelled from the surface by heat or vacuum, once the carbonaceous particulates are then wetted, they remain suspended in the carbonate until oxidized by reagents such as nitrites or nitrates in the melt. The chemisorbed gases formed primarily by absorbed water at low temperatures that is subsequently expelled at elevated temperatures, would not be present in carbonaceous particulates as they come from spark ignition engines. Thus, the molten carbonate would act as an effective absorbent to remove carbonaceous particles from internal combustion exhaust gas.

EXAMPLE 13

Removal of lead compound and nitrogen oxides from automotive exhaust gas

A cylindrical device containing ⅔ of a cubic foot of No. 304 stainless steel mesh as packing was attached to the exhaust pipe of a 1967 Ford station wagon. A reservoir or sump of alkali metal carbonate melting at about 395° C. was maintained in the device, the heat of the exhaust melted the carbonate and maintained it in the molten state. A venturi was utilized to continuously draw molten carbonate into the exhaust gas stream prior to it contacting the stainless steel mesh. As a result the molten carbonate was continuously dispersed over the mesh, wetting it. This stainless steel mesh packing therefore served both as a molten salt mist eliminator, i.e., demister, and also to increase the surface area contact between the molten salt and the exhaust gas. The automobile was driven at normal driving speeds on both surface streets and freeways for about one month with the attached device. At the end of the test period, various data relating to $NO_x$ and lead removal from the exhaust were obtained.

Removal of nitrogen oxides, principally NO, was determined by attaching an electrolytic $NO_x$ analyzer to the inlet and outlet of the exhaust device. Lead removal efficiency was determined by sampling the exhaust gas before and after entering the device. A portion of the inlet exhaust to the device and a portion of the outlet exhaust from the device were passed through an ice-bath-cooled condensers to remove water, and then through 0.45 micron Millipore filters to remove particulates that were not removed in the condensers. The exhaust gas flowed from the filters to wet test meters to measure the volume of exhaust sampled. A sample of 200 liters of inlet gas and 60 liters of outlet gas was taken. After drying the contents in the ice-cooled trap and combining it with the material on the filter, the solid samples were analyzed by lead emission spectroscopy. Equal weights of homogenized material from the inlet and outlet were analyzed.

At speeds between 50 and 65 m.p.h., nitric oxide removal efficiencies of 25 and 15 percent, respectively, were obtained. At lower speeds, the nitric oxide removal efficiency was greater than 50 percent. These results indicate that an increase in residence time increases removal of ntirogen oxides. When the oxygen content of the exhaust was increased by injecting air into the automobile manifold using an air compressor, the nitrogen oxide removal efficiencies appeared to increase somewhat.

The inlet sample and outlet sample for lead removal determination was obtained over a range of driving speeds and showed that the molten carbonate device removed approximately 75% of the lead in the exhaust stream. Further testing was discontinued when a gasket leak was detected and it was noted that all the carbonate had drained out of the sump, leaving carbonate only on the mesh. This condition adversely affected the lead removal efficiency. Thus, it was observed, using X-ray fluorescence and qualitative nitrogen analysis of the carbonate that remained on the mesh at the conclusion of the test, that lead was present; also bromine, chlorine, sulfur, nitrite and nitrate. On repeating the lead removal using a new gasket and fresh mesh and melt, subsequent tests performed indicated that no lead was present in the outlet of the device, indicating a removal efficiency of at least 95%.

While certain exemplary reactions have been described for both absorption and regeneration of various of the impurities recited, it has been found that the actual mechanism of reaction that occurs in these steps is a highly complex one, and several competing reactions may occur simultaneously. It should be apparent that where several of the reactions concurrently occur in the molten salt, the actual reaction mechanism can become very involved. Additionally, the presence or absence of various compounds or other impurities in the gaseous exhaust can affect the reactions. For example, the presence or absence of oxygen and CO in the exhaust gas might have an effect upon the temperature of absorption and the residence time for the absorption to occur in order to remove $NO_x$ from the gas. As a further illustration of the complexity of the mechanisms involved in the absorption and regeneration reactions, attention is directed to the previous discussion concerning the presence of packing material to aid in the absorption of $NO_x$ by the molten salt. This packing material is generally in the form of a loosely woven metal mesh so as not to unduly impede the gas flow, and serves to increase the surface area of contact between the melt and the gas and/or demist, i.e., eliminate the molten salt mist or fog from the gas stream. Though the mechanism involving the presence of the packing as an aid to the absorption is not fully understood at this time, it is known that the molten salt readily absorbs $NO_2$ and does not as readily absorb NO. Thus, while not being limited to a given theory, it is postulated that the NO present in the gas is converted to $NO_2$ at the mesh surface which serves as a catalyst for the reaction. Then the resulting $NO_2$ is more readily absorbed and removed from the exhaust gas. Thus use of an unwetted packing as a catalytic preoxidation mesh for oxidizing NO to $NO_2$ prior to contacting the nitrogen oxides with the molten salt may be useful for reducing the residence time and promoting removal of nitrogen oxides under various conditions.

While the subject invention finds its principal utility in the removal of impurities from flue gas and automotive exhaust gas, other waste gases may also be treated in accordance with the present invention, particularly for the removal of halides therefrom. Thus the present process is useful for the removal of hydrogen fluorides present in the waste gas from phosphate fertilizer plants, in which phosphate rock is decomposed by treatment with strong mineral acids. Emission of these fluorides into the atmosphere results in the destruction of vegetation in the vicinity of such plants. Also, the process is useful in removing aluminum chloride impurities emitted in the waste gases of electrolytic cells used in the production of aluminum. The present process finds further utility in treating waste gases emitted from galvanizing plants to remove zinc chloride impurities present in these gases. Further, malodorous organic sulfur-containing compounds, such as methyl and ethyl mercaptans and carbonyl sulfide, may be removed by the present process from the waste gases emitted by diesel engines and by wood-pulping plants.

As can be appreciated, the herein invention particularly relates to the utilization of a molten alkali carbonate mixture. Thus, though the invention has been described with respect to specific concentration, reaction times, temperatures and other reaction conditions, it should be apparent that one skilled in the art can determine the optimum conditions for the reaction depending upon the impurity to be removed, and the environment under which the reactions occur.

It will further be understood that various modifications can be made in the design and operation of the present invention without departing from the spirit thereof. Thus, while the principle, preferred construtcion, and mode of operation of the invention have been explained and what is now considered to represent its best embodiment has been illustrated and described, it should be understood that within the scope of the appended claims the invention may be practiced otherwise than as specifically illustrated and described.

I claim:

1. The process of removing a nitrogen oxide impurity from a $CO_2$-containing waste gas which comprises contacting the waste gas at a temperature of at least 350° C. with a molten salt mixture containing alkali metal carbonates as active absorbent for said nitrogen oxide impurity.

2. The process according to claim 1 wherein said waste gas is contacted at a temperature between 350 and 500° C. by said molten salt mixture which contains at least 50 wt. percent of said active absorbent consisting of a ternary mixture of the carbonates of lithium, sodium, and potassium.

3. The process according to claim 2 wherein the reaction temperature is between 400 and 450° C. and the molten salt mixture consists essentially of, in mole percent, 45±5 lithium carbonate, 30±5 sodium carbonate, and 25±5 potassium carbonate.

4. The process according to claim 1 wherein said nitrogen oxide-containing gas is contacted with said molten salt in the presence of at least one packing.

5. The process of claim 4 wherein
the waste gas is first contacted with said molten salt, and
said waste gas is then passed through said packing so arranged that said packing serves both as a mist eliminator to remove entrained molten salt from said gaseous mixture and to increase the surface area contact between said molten salt and said gaseous mixture.

6. The process of claim 4 wherein at least a portion of said packing is wetted with said molten salt prior to having said waste gas contact said salt.

7. The process of claim 4 wherein said packing is a metal mesh substantially non-reactive with said molten salt at the temperature of absorption.

8. The process of removing a combustion-resulting impurity from a $CO_2$-containing exhaust gas from an internal combustion engine, said removable impurity being derived from the fuel whose combustion results in formation of the exhaust gas, and said impurity being further selected from the group consisting of nitrogen oxides, lead halides, solid metal oxide ash, and carbonaceous particulate matter residue, which comprises contacting said exhause gas at a temperature between 350 and 800° C., with a molten salt mixture containing at least 10 wt. percent of a ternary mixture of the carbonates of lithium, sodium and potassium as an active absorbent for said impurities.

9. The process according to claim 8 wherein the molten salt mixture consists essentially of, in mole percent, 45±5 lithium carbonate, 30±5 sodium carbonate, and 25±5 potassium carbonate.

10. The process of removing at least nitrogen oxides from combustion gas produced by burning a hydrocarbon fuel which comprises contacting the nitrogen oxide-containing combustion gas at a temperature of at least 350° C. with a molten salt mixture containing alkali metal carbonates as active absorbent to convert said nitrogen oxides to the nitrites and nitrates of said alkali metals, and reacting said alkali metal nitrites and nitrates in said molten salt at a temperature between 400 and 600° C. with a reducing agent selected from the group consisting of carbon monoxide and carbonaceous materials to regenerate alkali metal carbonates for recirculation in the process.

11. The process of claim 10 wherein said combustion gas is contacted with said molten salt in the presence of a packing wetted by said molten salt.

12. The process according to claim 10 wherein the reducing agent is activated carbon.

13. The process according to claim 10 wherein the nitrogen content of the resultant gaseous mixture consists principally of elemental nitrogen.

14. The process of claim 10 wherein said combustion gas additionally contains fly ash which is absorbed by said molten salt mixture, and said fly ash is removed therefrom prior to reacting said alkali metal nitrites and nitrates with said reducing agent.

15. The process of claim 1 wherein said waste gas is a CO-containing exhaust gas from an internal combustion engine.

16. The self-regenerative process for the removal of NO present in a CO-containing exhaust gas from an internal combustion engine which comprises contacting said CO-containing exhaust gas with a molten salt containing a ternary mixture of alkali metal carbonates as active absorbent to convert said NO to elemental nitrogen while regenerating said alkali metal carbonate absorbent, and providing a purified exhaust gas having substantially reduced NO content.

17. The process of claim 16 wherein the CO-containing exhaust gas additionally contains lead species, and said gas-containing NO and lead species is contacted with the molten salt in the presence of a metal mesh.

18. The process of claim 17 wherein the molten salt absorbent consists essentially of, in mole percent, 45±5 lithium carbonate, 30±5 sodium carbonate, and 25±5 potassium carbonate.

19. The process according to claim 1 wherein said nitrogen oxide impurity includes nitric oxide, and said waste gas containing said nitric oxide is contacted with oxygen on an unwetted catalytic packing for oxidizing said nitric oxide to nitrogen dioxde prior to contactng said waste gas with said molten salt mixture.

References Cited

UNITED STATES PATENTS

| | | | |
|---|---|---|---|
| 1,624,147 | 4/1927 | Poindexter et al. | 23—79 |
| 3,505,018 | 4/1970 | Bawa et al. | 23—150 X |
| 3,563,029 | 2/1971 | Lowes | 23—2 E |
| 3,671,185 | 6/1972 | Lefrancois et al. | 23—2 R |
| 2,375,758 | 5/1945 | Bates | 23—104 X |
| 3,438,722 | 4/1969 | Heredy et al. | 23—2 SQ |
| 2,032,699 | 3/1936 | Hayes et al. | 23—104 |
| 3,438,727 | 4/1969 | Heredy | 23—181 |

FOREIGN PATENTS

| | | | |
|---|---|---|---|
| 1,137,582 | 12/1968 | Great Britain | 23—89 |
| 1,427 | 3/1883 | Great Britain | 23—1785 |

OTHER REFERENCES

Mellor: "Comprehensive Treatise on Inorganic and Theoretical Chemistry," Longmans, Green & Co., New York, N.Y., vol. 2, 1922, p. 820.

EARL C. THOMAS, Primary Examiner

U.S. Cl. X.R.

23—284; 60—274, 297, 311; 423—212, 235, 240, 242, 215.5

PO-1050
(5/69)

UNITED STATES PATENT OFFICE
CERTIFICATE OF CORRECTION

Patent No. 3,754,074                     Dated August 21, 1973

Inventor(s) LeRoy F. Grantham

It is certified that error appears in the above-identified patent and that said Letters Patent are hereby corrected as shown below:

Column 11, line 23, "not" should read --no--.
Column 12, line 43, "$M_2SO_3(1)$ +" should read --$M_2SiO_3(1)$ +--;
Column 12, line 45, "3,348,728" should read --3,438,728--.
Column 13, line 60, "bypass" should read --bypasses--.
Column 14, line 39, "illustrates" should read --illustrate--.
Column 16, line 14, "as" should read --was--.
Column 18, in Table V under Column heading $PbCl_2$ found (mg.), "1.320" should read --1320--;
Column 18, in the notes of Table V, the equation should read
$$\frac{2.297-0.092}{2.500-0.092} = \frac{2.205}{2.408} = 91+\%$$--.
Column 21, line 43, "strutcion" should read --construction--.
Column 22, line 20, "exhause" should read --exhaust--.
Column 23, line 5, "dioxde" should read --dioxide--.

Signed and sealed this 19th day of February 1974.

(SEAL)
Attest:

EDWARD M. FLETCHER, JR.
Attesting Officer

C. MARSHALL DANN
Commissioner of Patents